(12) United States Patent
Banerjee

(10) Patent No.: US 8,775,732 B1
(45) Date of Patent: Jul. 8, 2014

(54) METHOD AND SYSTEM FOR PASSING INFORMATION TO DISK ARRAYS FOR EFFICIENT STORAGE MANAGEMENT

(75) Inventor: Anindya Banerjee, Pune (IN)

(73) Assignee: Symantec Corporation, Mountain View, CA (US)

( * ) Notice: Subject to any disclaimer, the term of this patent is extended or adjusted under 35 U.S.C. 154(b) by 217 days.

(21) Appl. No.: 13/097,415

(22) Filed: Apr. 29, 2011

(51) Int. Cl.
*G06F 11/34* (2006.01)
*G06F 17/18* (2006.01)

(52) U.S. Cl.
USPC .......................................... 711/114; 711/141

(58) Field of Classification Search
None
See application file for complete search history.

(56) References Cited

U.S. PATENT DOCUMENTS

| | | | | |
|---|---|---|---|---|
| 7,472,143 | B2 * | 12/2008 | Enko et al. | 1/1 |
| 7,536,505 | B2 * | 5/2009 | Takakuwa | 711/114 |
| 7,657,706 | B2 * | 2/2010 | Iyer et al. | 711/117 |
| 2010/0185793 | A1 * | 7/2010 | Muroyama | 710/34 |

* cited by examiner

*Primary Examiner* — Matthew Bradley
*Assistant Examiner* — Candice Rankin
(74) *Attorney, Agent, or Firm* — Campbell Stephenson LLP

(57) ABSTRACT

A system and method for passing data access information to a disk array are provided. Data access statistics are received from a first source. Thereafter, a determination is made as to whether such data access statistics are to be included in a list of data access statistics. A frequency analysis is then performed by a disk array using the list of data access statistics. An assignment of data to storage blocks within the disk array is then made according to results of the frequency analysis.

21 Claims, 8 Drawing Sheets

METHOD AND SYSTEM FOR PASSING INFORMATION TO DISK ARRAYS FOR EFFICIENT STORAGE MANAGEMENT

FIELD OF THE INVENTION

This invention relates to storage management, and more particularly, to disk array storage management.

DESCRIPTION OF THE RELATED ART

A disk array is a type of storage device that organizes data into logical blocks. A disk array can monitor the data accessed by an application. In response, the disk array can calculate the frequency with which data in each logical block is accessed. A disk array can then manage the placement of data within a logical block according to the frequency with which data is accessed. As the frequency of data access changes, the placement of data within logical blocks can be modified accordingly.

SUMMARY OF THE INVENTION

Various systems and methods for passing data access information to a disk array are disclosed. For example, one method involves receiving data access statistics from a first source and determining whether such data access statistics are to be included in a list of data access statistics. A disk array in communication with the first source then performs a frequency analysis using the list of data access statistics. Data is then assigned to storage blocks within the disk array according to results of the frequency analysis. The first source can be one of a file system or an application.

In one embodiment, the data access statistics are included in the list of data access statistics if the data access statistics describe data operations performed using a cache of a file system. In another embodiment, the data access statistics are excluded from the list of data access statistics if the data access statistics describe operations performed as part of a backup process or a virus scan process. In yet another embodiment, the data access statistics are also excluded if the data access statistics describe operations performed as part of a defragmentation process.

The method may also involve receiving the data access statistics via a data plane coupling the first source and the disk array. In another embodiment, the data access statistics are received via a control plane and the data access is performed via a data plane.

Another example method involves a first source identifying data access statistics. Once identified, the method involves determining whether the data access statistics have been detected by a disk array coupled to the first source. If the data access statistics have been detected by the disk array, instructions to exclude the data access statistics from a frequency analysis are communicated to the disk array. Alternatively, if the data access statistics have not been detected by the disk array, the data access statistics and instructions to include the data access statistics in a frequency analysis are communicated to the disk array.

An example of a system can include one or more processors and memory coupled to the processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
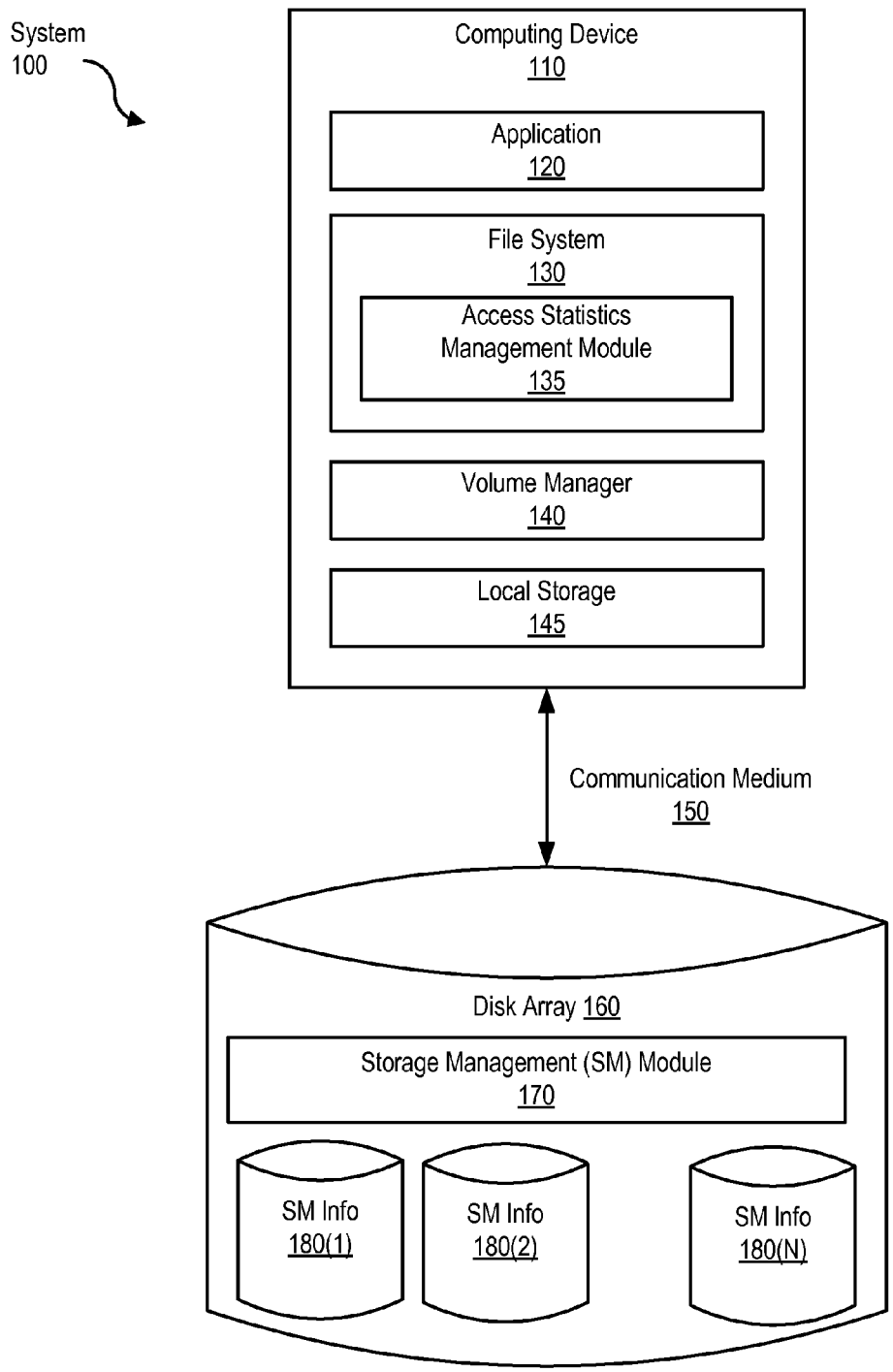
FIG. 1 is a block diagram showing a system for passing storage management information to a disk array, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents, and alternatives falling within the spirit and scope of the invention defined by the appended claims.

DETAILED DESCRIPTION

FIG. 1 is a block diagram showing a system 100 for passing storage management information to a disk array. Storage management information can include information regarding data access, typically referred to as data access statistics, and/or instructions for handling such data access statistics. Data access statistics can include information regarding the data accessed by an operation, the type of operation performed on such data, the timestamp during which the operation was performed on the data, the location of the data within a storage device (e.g., the disk array) and so on.

The system 100 of FIG. 1 includes a computing device 110. Computing device 110 includes an application 120, a file system 130 (which further includes an access statistics management module 135), a volume manager 140, and local storage 145. Computing device 110 is shown as being coupled via communication medium 150 to disk array 160 (which further includes a storage management module 170 and N number of storage management information volumes 180(1)-(N)).

Computing device 110 can be any type of computing device, such as a desktop, a laptop computer, a telephone, a server, and so on. Computing device 110 includes application 120. Application 120 can be described as any type of application being executed by and running on computing device 110. Examples of application 120 can include a document creation and editing program, a note taking program, an internet connection program, a calling utility, a database, and so on. When running, application 120 performs read and write operations on data files within file system 130.

File system 130 organizes data within disk array 160 into files and folders. Typically, application 120 views data as files and folders of file system 130. For example, application 120 can view a list of folders displayed by file system 130, select a folder, view individual files within that folder, and select one such file for viewing and possible editing. Thus, file system 130 provides the organization for application 120 to find, retrieve, access, and modify data within file system 130.

File system 130 can use one of several possible file system formats for organizing data into files and folders. Examples of file system formats include File Allocation Table (FAT), New Technology File System (NTFS), Hierarchical File System (HFS), High-Performance File System (HPFS), Unix File System (UFS), Veritas File System (VxFS), and so on.

File system 130 further includes an access statistics management module 135. Access statistics management module 135 monitors file system activity and generates data access statistics for such file system activity. Access statistics management module 135 is configured to detect activity during which application 120 accesses and/or modifies data files of file system 130. Whenever such activity is detected, access management module 135 generates corresponding data access statistics to describe the activity. For example, if access statistics management module 135 detects that a data file of file system 130 is read by application 120, access management module 135 will generate data access statistics describing the read operation, the timestamp during which the read was performed, the data file accessed by the read operation, and the location of such data (e.g., local storage 145 or disk array 160).

Access statistics management module 135 can also be configured to receive data access statistics from components within computing device 110. For example, access statistics management module 135 can receive data access statistics directly from an application 120 (e.g., such as a database) after such data access statistics have been generated by application 120. In addition, although not shown, access statistics management module 135 can exist within application 120 instead of file system 130 or can exist within both file system 130 and application 120.

Access statistics management module 135 determines what, if anything, disk array 160 should do with data access statistics when making storage management decisions. For example, access statistics management module 135 can determine that certain data access statistics should be excluded or included in storage management decisions made by disk array 160. Access statistics management module 135 can be configured to determine that data access statistics should be included in storage management decisions in situations where data access statistics are undetected by a disk array and excluded from storage management decisions in situations where data access statistics are a result of background maintenance operations performed on computing device 110.

Data access statistics can be undetected by a disk array when, for example, file system 130 copies a logical block of disk array 160 into local storage 145 (e.g. a file system cache) and then performs a subsequent read operation using the data in local storage 145 and not the data within disk array 160. In this case, disk array 160 will not detect the resulting data access statistics from such an operation, given that disk array 160 maintains data access statistics only for data accessed directly from disk array 160. Thus, even though data may be accessed relatively frequently in the file system's local storage, the disk array data access statistics for the data may indicate that the data is not accessed frequently, since disk array 160 does not monitor activity outside of disk array 160.

Data access statistics can be a result of background maintenance operations performed on computing device 110 when, for example, computing device 110 performs a backup operation, a virus scan, or a defragmentation process. In these cases, data is accessed for maintenance operations which are not operations generated by a user application, such as application 120. Data is accessed in these cases to copy a section of data and/or to detect and correct errors in data. Storage management decisions are ideally based on the frequency of data access for user applications and not background maintenance operations.

In cases where data access statistics should be excluded or included in storage management decisions, access statistics management module 135 generates corresponding instructions to be sent to disk array 160. Access statistics management module 135 then initiates the communication of data access statistics and/or corresponding instructions from file system 130 to disk array 160 via communication medium 150. Access statistics management module 135 can also initiate the communication of data access statistics and/or corresponding instructions from application 120 to disk array 160 via communication medium 150.

Communicating such data access statistics and corresponding instructions to disk array 160 allows disk array 160 to maintain a more accurate and complete set of data access statistics to help make more informed storage management decisions based on the frequency of data access. Doing so avoids the problem of having the disk array make storage management decisions based on incorrect or incomplete data access information and thus less optimal placement of data within data blocks of the disk array.

Volume manager 140 allocates physical sectors of disk array 160 into a logical volume. This logical volume includes the files and folders represented by file system 130.

Communication medium 150 provides a communication path from file system 130 to disk array 160 to facilitate transporting data access information (e.g., data access statistics and/or corresponding instructions) from file system 130 to disk array 160. In some cases, communication medium 150 also provides a communication path from application 120 to disk array 160 to facilitate transporting data access information from application 120 to disk array 160. Communication medium can be any type of network, such as an intranet, a wide area network (WAN), a local area network (LAN), a personal area network (PAN), or the Internet.

As shown, communication medium 150 is illustrated as a single communication medium for providing all types of communication between file system 130 and disk array 160 or between application 120 and disk array 160. Alternatively, although not shown, communication medium 150 can also be divided into two communication mediums. In such cases, one communication medium (e.g., implementing a data plane) would be used to send read and write request information from file system 130 to disk array 160 or from application 120 to disk array 160. The second communication medium (e.g., implementing a control plane) would be used to send data access information from file system 130 to disk array 160 or from application 120 to disk array 160.

Disk array 160 is a data storage mechanism for computing device 110. Examples of disk array 160 can include just a bunch of disks (JBOD), a redundant array of independent disks (RAID), a DVD/CD jukebox, a tape array, and other types of media.

Disk array 160 organizes data into logical blocks. A logical unit number (LUN) is used to represent each logical block of a disk array. A system typically locates data within a logical block of a disk array by referencing a LUN that corresponds to such a logical block. For example, a storage array can include 10 logical blocks respectively represented by LUNs 1-10. To access data in the second logical block, the system can send a request to access the data stored in the block identified by LUN 2.

Storage management module 170 manages the allocation of data into particular data blocks of disk array 160. In addition, storage management module 170 monitors data array activity and generates data access statistics for use in calculating the frequency with which data is accessed. Storage management module 170 can also receive data access statistics and/or corresponding instructions from file system 130 or from application 120. The data access statistics received from file system 130 or from application 120 can be combined with the data access statistics generated by storage management module 170 to maintain an updated list of data access statistics.

Storage management module 170 manages the allocation of data into logical blocks of disk array 160 to allow disk array 160 to perform hierarchical storage management. Logical blocks of disk array 160 can be distinguished based on several factors. For example, logical blocks of disk array 160 can be distinguished based on the cost of maintaining the logical blocks, the performance capabilities of logical blocks, and/or the storage capacity of logical blocks. Differentiating logical blocks from one another allows a disk array to evaluate which logical blocks are the most optimal and which are less optimal. Ideally, the data that is the most accessed is allocated to the most optimal logical blocks of disk array 160 and the less accessed data is allocated to the less optimal logical blocks of disk array 160.

As the frequency of data changes, disk array 160 can seek to move data from one logical block to another in order to reflect the most up to date data access information. A disk array maintains a list of data access statistics, which is used to make storage management decisions. This list of data access statistics is used to perform a data access frequency calculation, which determines the frequency with which data is accessed in descending or ascending order. Once identified, storage management module 170 can allocate data to a new set of logical blocks to represent the most up-to-date access information.

Storage management information volumes 180(1)-(N) are local storage volumes within disk array 160. Storage management information volumes 180(1)-(N) store lists of data access statistics used by storage management module 170. Lists of data access statistics can be stored within each storage management information volume after a certain time interval or after a specified number of operations and can reflect the combined statistics from file system 130 or application 120 received during the same time period.

Figure 2:
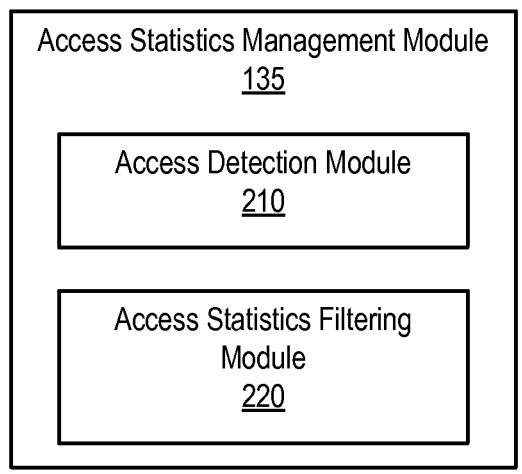
FIG. 2 illustrates an access statistics management module, according to one embodiment of the present invention.

FIG. 2 illustrates an architecture of an access statistics management module 135 implemented within a file system or an application. Access statistics module 135 includes an access detection module 210 and an access statistics filtering module 220.

Access detection module 210 identifies data accesses and generates data access statistics. Data access takes place any time a read, write, or other operations (e.g., such as create, rename, close, etc,) is performed on data stored within a computer system. This data can reside within a disk array, a file system cache, or any other data storage coupled to a computing device. Access detection module 210 can identify access to all data or to a portion of the data and generate data access statistics. Data access can be identified by monitoring activity, a data plane, or a control plane of a file system or an application. Data access statistics can then be generated according to the operations performed on the data (e.g., to describe the access or time period, the type of operation, the data accessed, the location of the data accessed, etc.). Access detection module 210 can also identify data access statistics generated elsewhere and received by access statistics management module 135.

Access statistics filtering module 220 makes a determination as to whether any of the identified data access statistics should be flagged for inclusion or exclusion in a data access frequency calculation by a disk array. For example, access statistics filtering module 220 flags data access statistics that have been undetected by a disk array or data access statistics corresponding to background maintenance operations. Examples of data access statistics that are undetected by a disk array relate to scenarios where data access occurred from a local storage of a file system and not from the disk array itself. Examples of data access statistics that correspond to background maintenance operations relate to scenarios where a computing device performs operations as part of a backup, virus scan, or defragmentation process.

Access statistics filtering module 220 generates instructions for a disk array to indicate whether the data access statistics being communicated to the disk array should be included or excluded from a data access frequency calculation. Thereafter, access statistics filtering module 220 initiates communication of the data access statistics and/or corresponding instructions to a disk array. Communication can be initiated by formatting information into a request to be sent to the disk array, where the request complies with a communication protocol.

Figure 3:
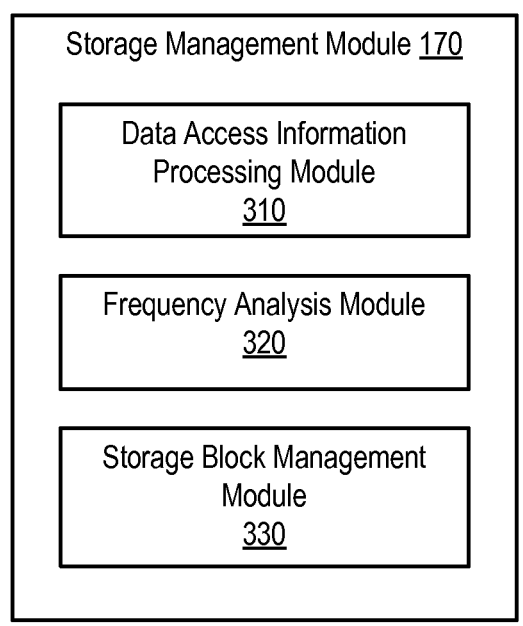
FIG. 3 illustrates a storage management module, according to one embodiment of the present invention.

FIG. 3 illustrates an architecture of a storage management module 170 implemented within a disk array. Storage management module 170 includes data access information processing module 310, a frequency analysis module 320, and a storage block management module 330.

Data access information processing module 310 receives data access information from a file system or an application. This information can be received, for example, via a communication interface and can include data access statistics, data access statistics and instructions, or a reference to data access statistics and instructions. Data access information processing module 310 analyses the received data access information and determines what to do with identified or received data access statistics.

In response, data access information processing module 310 can include or exclude the identified or received data access statistics from a list of data access statistics. A disk array typically maintains a list of data access statistics. Data access information processing module 310 can include or exclude the identified or received data access statistics to the disk array's list of data access statistics to maintain the most up-to-date list of data access statistics.

Frequency analysis module 320 performs a data access frequency calculation for the disk array. This analysis can be performed by retrieving or referencing the most up-to-date list of data access statistics maintained by data access information processing module 310. This data access frequency calculation indicates how often data within a logical block of a disk array is accessed. Data within a logical block can be identified by referencing the LUN assigned to such a logical block.

The resulting frequency analysis information (e.g., indicating the frequency with which data is accessed in ascending or descending order) is used by storage block management module 330 to allocate and migrate data within logical blocks of a disk array. Data can then be assigned or re-assigned to logical blocks of the disk array according to the frequency with which each section of data is accessed (e.g., to allocate the most accessed data to the highest performing and most readily available data blocks). This assignment of logical blocks can be repeated at set interval times to reflect the most up-to-date frequency analysis results.

Figure 4:
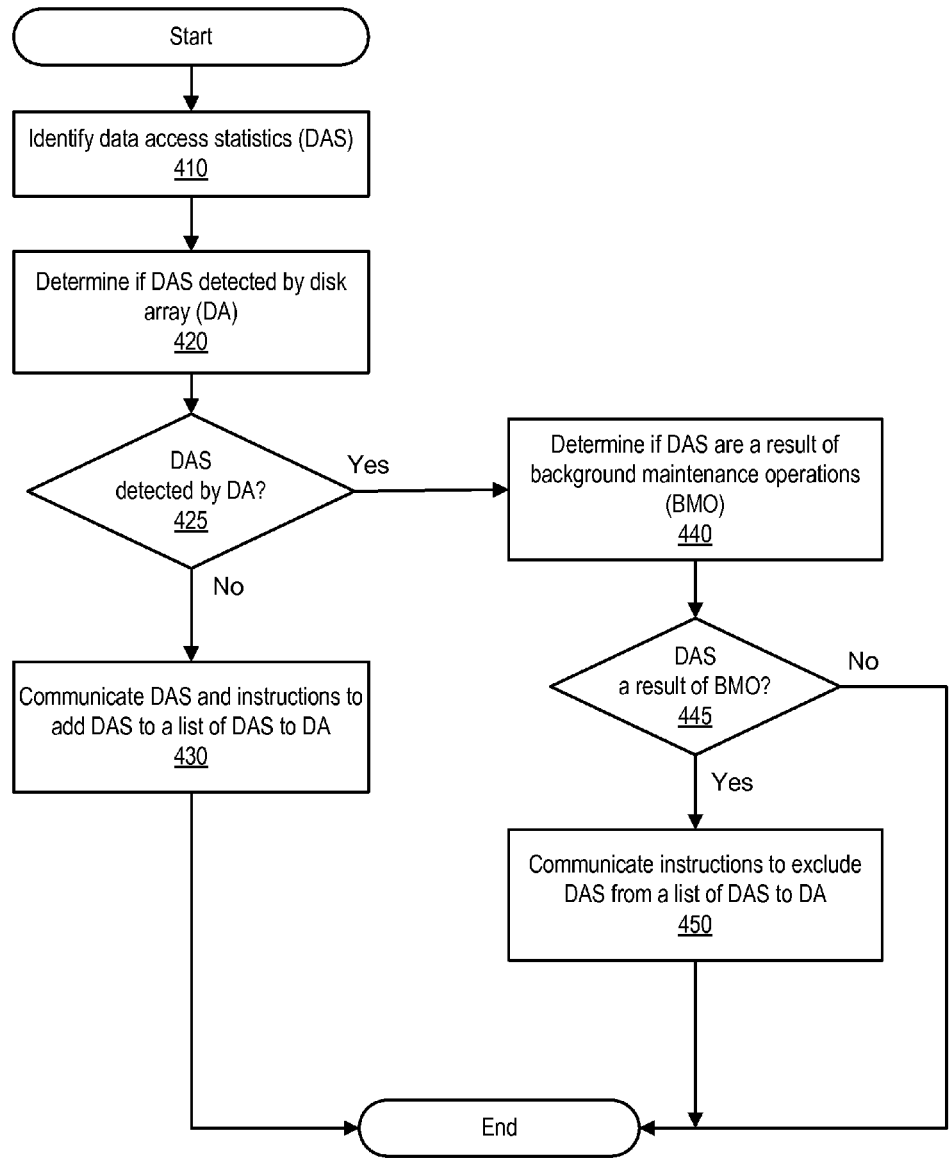
FIG. 4 is a flowchart illustrating an example of a process for communicating data access information to a disk array, as performed by a file system, according to one embodiment of the present invention.

FIG. 4 is a flowchart illustrating an example of a process for communicating data access information to a disk array, as performed by a file system. As will be appreciated, the process of FIG. 4 can also be performed by an application.

The process of FIG. 4, as performed by a file system, begins at 410 where the file system identifies a set of data access statistics. Data access statistics are typically generated by a file system in response to monitoring operations performed on data blocks (e.g., by monitoring read and write operations performed on data blocks). The scope of data blocks monitored by the file system, as well as the frequency with which data access statistics are generated, can depend on file system configurations. Once generated, a portion or all of the data statistics generated can be identified at 410.

At 420, the file system determines if the data access statistics identified in 410 have been detected by a disk array. Data access statistics may not be detected by a disk array in cases where data is not directly accessed from the disk array to perform an operation. An example of this can occur whenever a file system copies a data block or set of data blocks from the disk array onto local storage (e.g., a file system cache) and subsequently performs an operation (e.g., a read operation) by accessing the data stored in local storage and not from the disk array itself.

The process continues at 425, where a decision is made as to whether the data access statistics have been detected by the disk array. If the data access statistics have not been detected by the disk array, the process continues to 430. At 430, the file system communicates the data access statistics and instructions indicating that the data access statistics should be added to a list of data access statistics maintained by the disk array. This list of data access statistics is used by the disk array to calculate the frequency with which data is accessed by a computer system.

Alternatively, if the data access statistics have been detected by the disk array, the process continues to 440. At 440, the file system determines if the data access statistics are a result of operations performed as part of background maintenance operations that are not generated by user applications. Examples of background maintenance operations can include a backup operation, a virus scan, or a defragmentation process performed on the computer system. This determination is made at 445.

If the data access statistics are a result of background maintenance operations, the process continues to 450. At 450, the file system communicates instructions indicating that the data access statistics should be removed from the list of data access statistics maintained by the disk array. The process then ends. Alternatively, if the data access statistics are not a result of a background maintenance operation, the process ends.

Figure 5:
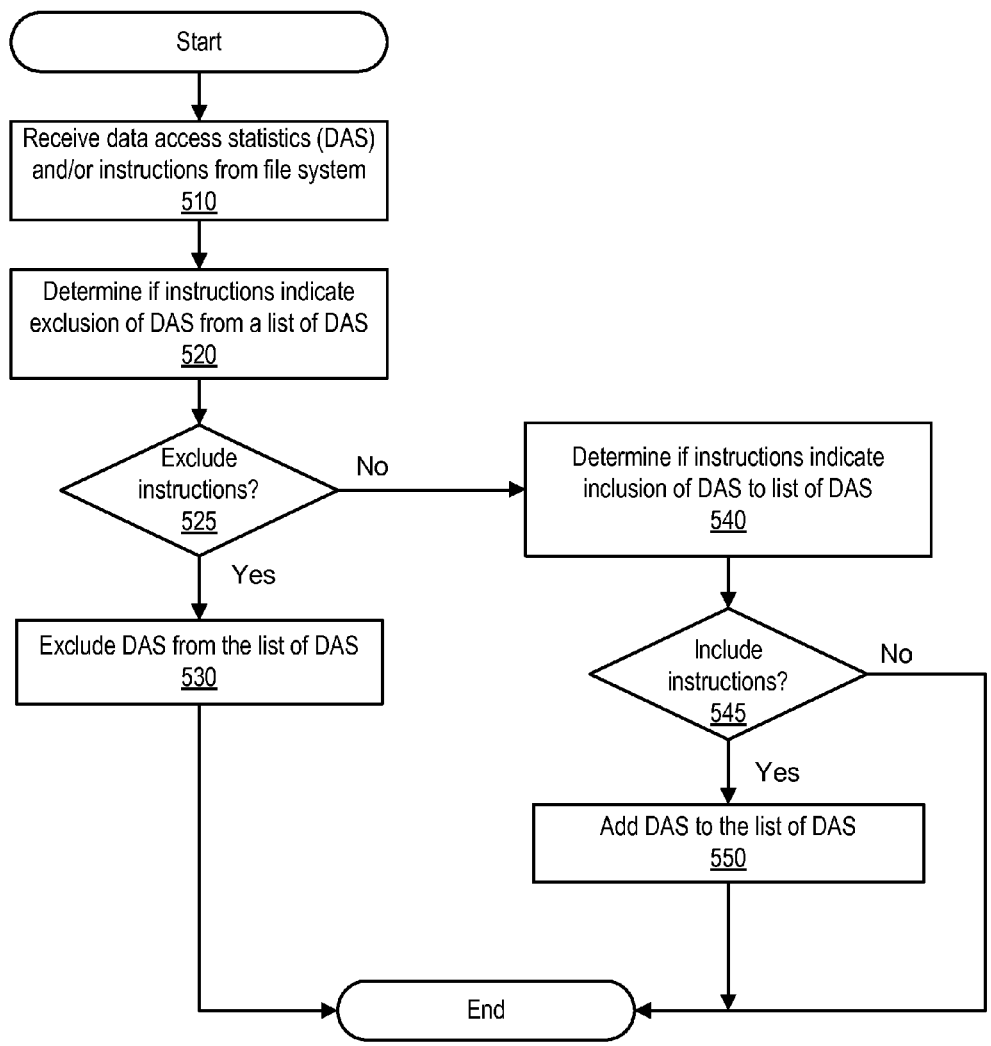
FIG. 5 is a flowchart illustrating an example of a process for receiving and processing data access information, according to one embodiment of the present invention.

FIG. 5 is a flowchart illustrating an example process for receiving and processing data access information, as performed by a disk array. The process begins at 510 where the disk array receives data access statistics and/or instructions from a file system or an application. This information can be received by the disk array via a communication medium existing between the file system and the disk array or the application and the disk array, where the communication medium is an extension of an existing communication medium or a new communication medium dedicated to communicating data access information to the disk array.

At 520, the disk array determines if the received instructions indicate that the received data access statistics should be excluded from a list of data access statistics. The disk array typically maintains a list of data access statistics. This list of data access statistics tracks the data access statistics resulting from operations performed on data within the disk array. For example, accessing data within a disk array to perform a read or write operation results in data access statistics for such an operation. Such data access statistics can describe the type of transaction performed, the data accessed, the location of the data accessed, the changes made to such data, and so on.

A list of data access statistics can be modified to create an updated list of data access statistics. Such modifications can be a result of a read/write operation performed on data with the disk array or can be a result of instructions from a file system or an application. These instructions may indicate that data access statistics should be included or excluded from a list of data access statistics according to undetected data access statistics or background maintenance operations (e.g., backup, virus scan, or defragmentation process) performed on a computing device.

A determination as to whether the received instructions indicate that the received data access statistics should be excluded is made at 525. If the received instructions indicate that the received data access statistics should be excluded from the list of data access statistics, the process continues to 530. At 530, the data access statistics are excluded from the list of data access statistics maintained by the disk array and the process then ends.

Alternatively, if the process determines at 525 that the received instructions do not indicate that the received data access statistics should be excluded from a list of data access statistics, the process continues to 540. At 540, the disk array determines if the received instructions indicate that the received data access statistics should be included in a list of data access statistics. This determination is made at 545. If the received instructions indicate that the received data access statistics should be included in the list of data access statistics, the received data access statistics are added to the list of data access statistics maintained by the disk array, as shown in 550. The process then ends.

In another example of the process of FIG. 5, the disk array can first determine whether the received instructions indicate that the received data access statistics should be included in the list of data access statistics before determining whether the received instructions indicate that the received data access statistics should be excluded from the list of data access statistics. In yet another example of the process of FIG. 5, the disk array can determine if the received data access statistics are included in the list of data access statistics before making a determination as to whether the received instructions indicate that the received data access statistics should be included or excluded from the list of data access statistics.

Figure 6:
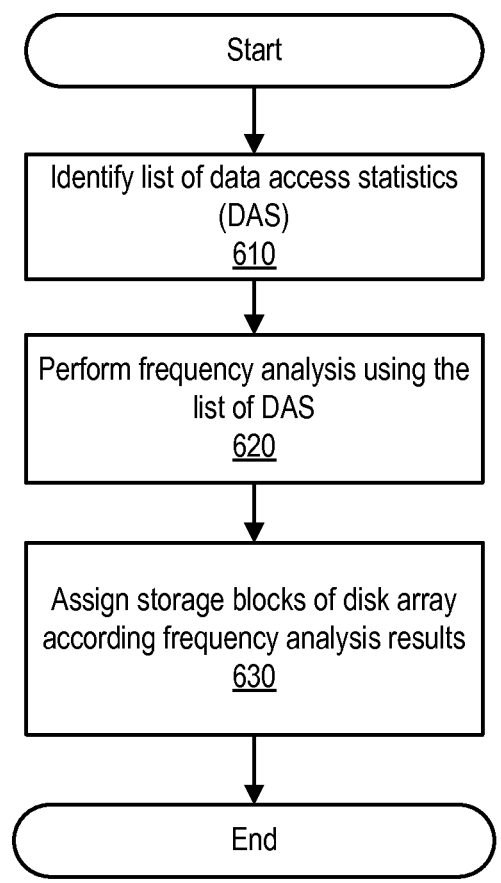
FIG. 6 is a flowchart illustrating an example of a process for performing disk array storage management, according to one embodiment of the present invention.

FIG. 6 is a flowchart illustrating an example of a process for performing disk array storage management, as performed by a disk array. The process begins at 610 where the disk array identifies data access statistics included within a list of data access statistics. The list of data access statistics typically maintains an updated list of data access statistics resulting from operations performed on data within the disk array itself. In addition, the list of data access statistics can also include data access statistics that were added in as a result of instructions received from a file system or an application. In some cases, the list of data access statistics excludes certain data access statistics, originally within the list of data access statistics, as a result of instructions from the file system or the application.

A file system or application can instruct a disk array to include data access statistics to a list of data access statistics in cases where such data access statistics were not detected by the disk array. For example, if a file system copies the contents of a storage block of the disk array into local storage (e.g., a file system cache) and subsequently performs a read operation using the contents of such a cache, the access statistics related to such an operation will not be detected by the disk array. This is because the data was accessed from the file system cache and not directly from the disk array.

In other scenarios, a file system or application can instruct a disk array to exclude data access statistics from the list of data access statistics in cases where data access statistics are a result of performing a backup, virus scan, or defragmentation process. By adding and/or excluding such data access statistics to a disk array's list of data access statistics, a disk array can make storage management decisions based on a more accurate representation of the data access performed on the data within the disk array.

At 620, the disk array performs a data access frequency analysis using the list of data access statistics. Such a frequency analysis analyzes the data access statistics within the list of data access statistics to determine the frequency with which each section of data in a logical block is accessed. By performing such an analysis, the disk array is able to rank the frequency with which data in a disk array is accessed. Once such an analysis is performed, the process continues to 630.

At 630, the disk array assigns storage blocks of the disk array according to frequency analysis results. The storage blocks of a disk array are based on a tiered model according to the frequency with which data is accessed. In a tiered storage, there are different levels of storage blocks with the different levels being distinguished according to cost, functionality, performance, and/or capacity. At 630, the more accessed data is assigned to the more optimal data blocks and the less accessed data is assigned to the less optimal data blocks within the disk array. Once assigned, data can be referenced within a storage block by its corresponding LUN. Once all memory blocks of the disk array have been assigned, the process then ends.

Figure 7:
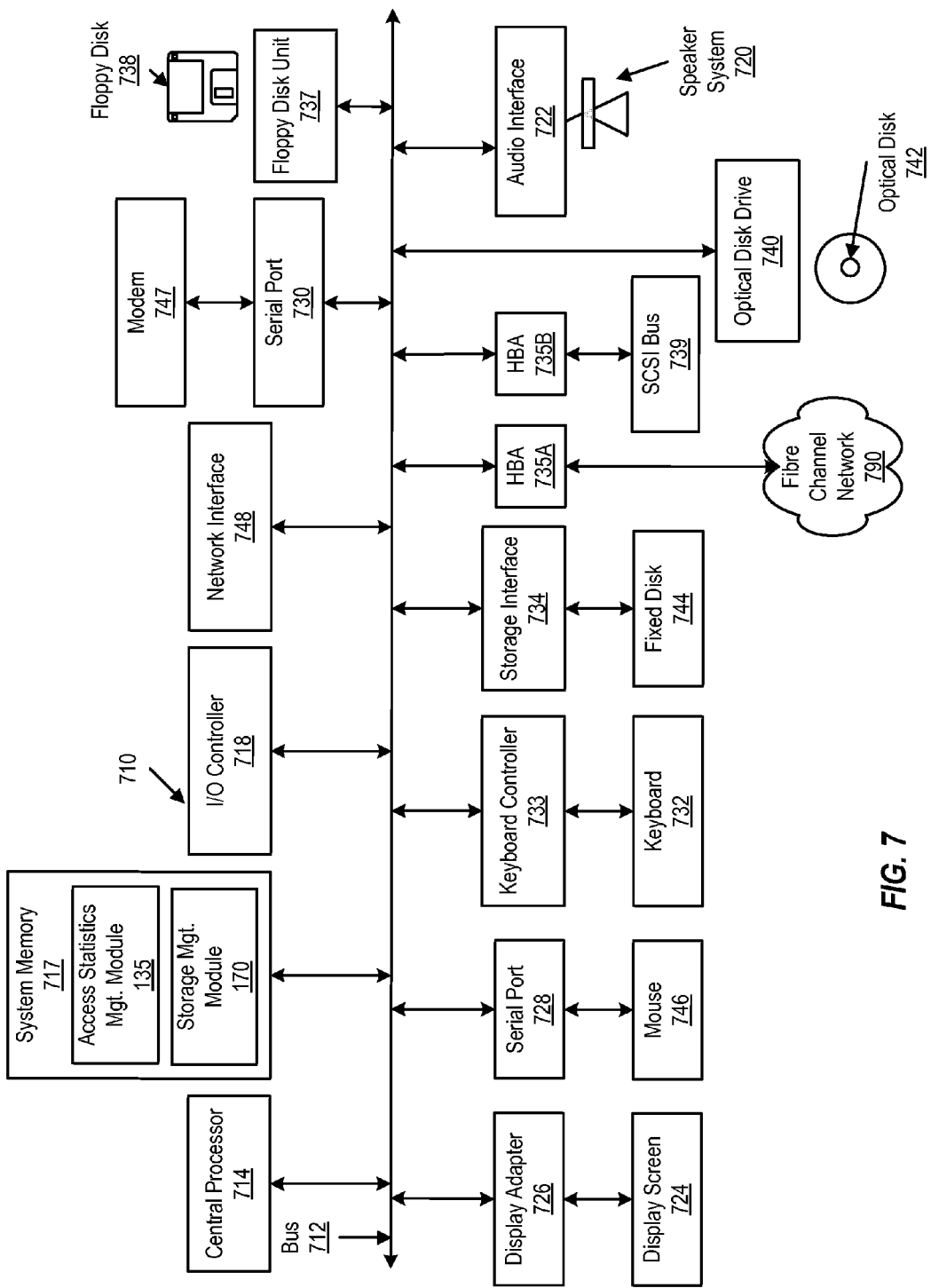
FIG. 7 is a block diagram of a computing system, according to one embodiment of the present invention.

FIG. 7 is a block diagram of a computing system suitable for relaying and receiving data access information, as described above. Computer system 710 includes a bus 712 which interconnects major subsystems of computer system 710, such as a central processor 714, a system memory 717 (typically RAM, but which can also include ROM, flash RAM, or the like, and which can also include software such as access statistics management module 135 and storage management module 170 like those shown in FIGS. 2 and 3), an input/output controller 718, an external audio device, such as a speaker system 720 via an audio interface 722, an external device, such as a display screen 724 via display adapter 726, serial ports 728 and 730, a keyboard 732 (interfaced with a keyboard controller 733), a storage interface 734, a floppy disk unit 737 operative to receive a floppy disk 738, a host bus adapter (HBA) interface card 735A operative to connect with a Fibre Channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which can include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 710 are generally stored on and accessed via a computer-readable medium, such as a hard disk drive (e.g., fixed disk 744), an optical drive (e.g., optical disk drive 740), a floppy disk unit 737, or other storage medium. Additionally, applications can be in the form of electronic signals modulated in accordance with the application and data communication technology when accessed via modem 747 or network interface 748.

Storage interface 734, as with the other storage interfaces of computer system 710, can connect to a standard computer-readable medium for storage and/or retrieval of information, such as a fixed disk drive 744. Fixed disk drive 744 can be a part of computer system 710 or can be separate and accessed through other interface systems. Modem 747 can provide a direct connection to a remote server via a telephone link or to the Internet via an internet service provider (ISP). Network interface 748 can provide a direct connection to a remote server via a direct network link to the Internet via a POP (point of presence). Network interface 748 can provide such connection using wireless techniques, including digital cellular telephone connection, Cellular Digital Packet Data (CDPD) connection, digital satellite data connection or the like.

Many other devices or subsystems (not shown) can be connected in a similar manner (e.g., document scanners, digital cameras, and so on). Conversely, all of the devices shown in FIG. 7 need not be present to practice the present invention. The devices and subsystems can be interconnected in different ways from that shown in FIG. 7. The operation of a computer system is readily known in the art and is not discussed in detail in this application. Code to implement the present invention can be stored in computer-readable storage media such as one or more of system memory 717, fixed disk 744, optical disk 742, or floppy disk 738. The operating system provided on computer system 710 can be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention can include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 8:
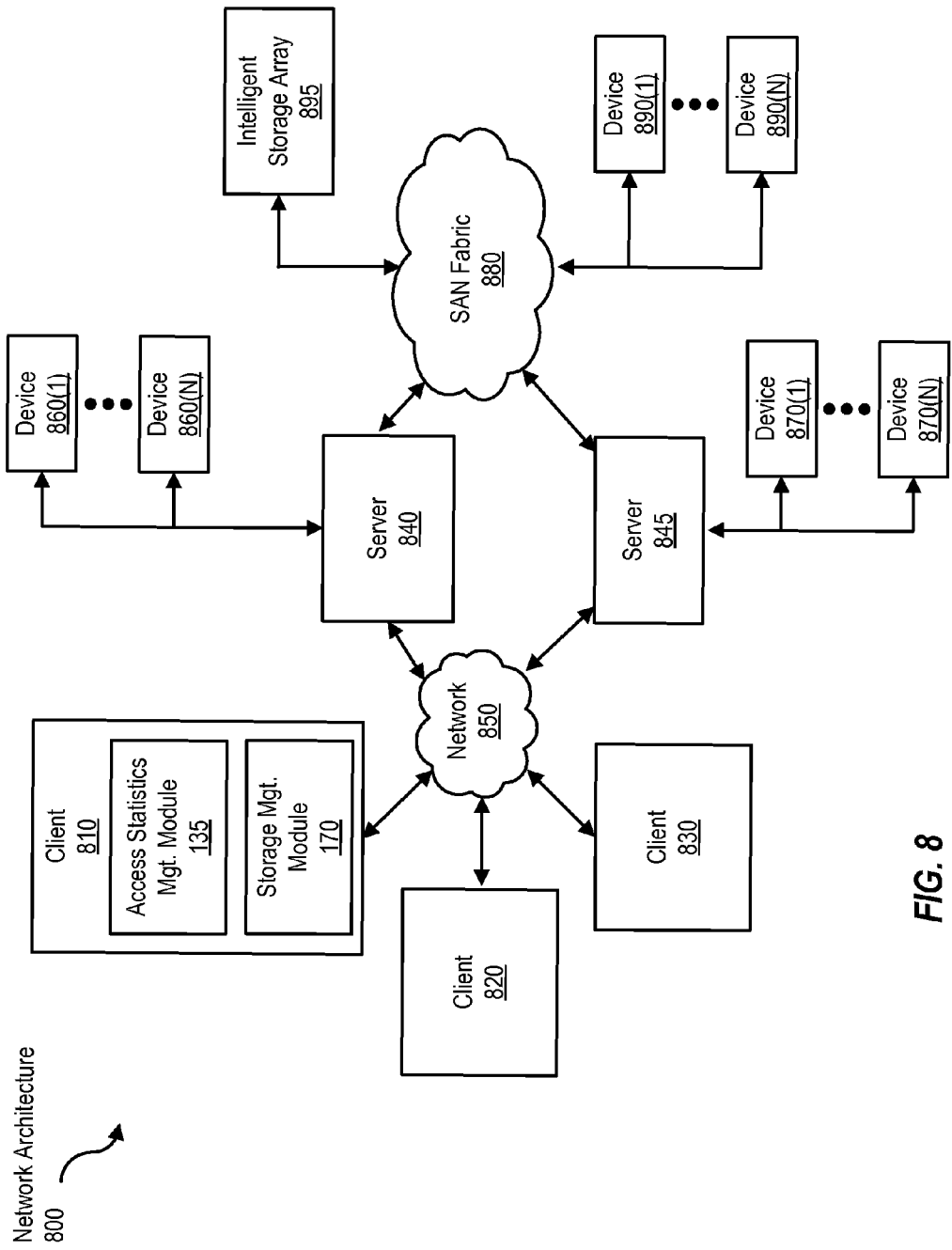
FIG. 8 is a block diagram of a network system, according to one embodiment of the present invention.

FIG. 8 is a block diagram of a network architecture 800 in which client systems 810, 820, and 830 and servers 840 and 845 can be coupled to a network 850. Client systems 810, 820, and 830 generally represent any type or form of computing device or system, such as computing system 710 in FIG. 7.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet. In one example, client systems 810, 820, and/or 830 and/or servers 840 and/or 845 can include an access statistics management module 135, as shown in FIG. 2, and a storage management module 170, as shown in FIG. 3.

As illustrated in FIG. 8, one or more storage devices 860(1)-(N) can be directly attached to server 840. Similarly, one or more storage devices 870(1)-(N) can be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) can represent network-attached storage (NAS) devices configured to communicate with servers 840 and 845 using various protocols, such as Network File System (NFS), Server Message Block (SMB), or Common Internet File System (CIFS).

Servers 840 and 845 can also be connected to a storage area network (SAN) fabric 880. SAN fabric 880 generally represents any type or form of computer network or architecture capable of facilitating communication between multiple storage devices. SAN fabric 880 can facilitate communication between servers 840 and 845 and a plurality of storage devices 890(1)-(N) and/or an intelligent storage array 895. SAN fabric 880 can also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to computing system 710 of FIG. 7, a communication interface can be used to provide connectivity between each client system 810, 820, and 830 and network 850. Client systems 810, 820, and 830 can be able to access information on server 840 or 845 using, for example, a web browser or other client software. Such software can allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the embodiments disclosed herein can be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the embodiments disclosed herein can also be encoded as a computer program, stored in server 840, run by server 845, and distributed to client systems 810, 820, and 830 over network 850.

In some examples, all or a portion of the computing devices in FIGS. 1, 2, 3, 7, and 8 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In addition, one or more of the components described herein can transform data, physical devices, and/or representations of physical devices from one form to another. For example, an access statistics management module 135 in FIG. 2 can transform data access information into data access statistics. In addition, a storage management module 170 in FIG. 3 can transform a list of data access statistics into a frequency analysis result.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving instructions, wherein
the instructions comprise instructions regarding data access statistics, and
the instructions are received from a first source;
determining whether the data access statistics should be included or excluded from a list of data access statistics, wherein
the determining is performed by a disk array, and
the determining is based on the instructions received from the first source;
in response to determining that the data access statistics should be included in the list of data access statistics, including the data access statistics in the list of data access statistics, wherein
the including is performed if the data access statistics comprise data access statistics previously undetected by the disk array;
in response to determining that the data access statistics should be excluded from the list of data access statistics, excluding the data access statistics from the list of data access statistics, wherein
the excluding is performed if the data access statistics comprise data access statistics corresponding to background maintenance operations;
performing a frequency analysis using the list of data access statistics, wherein
the frequency analysis is performed by the disk array, and
the disk array is in communication with the first source; and
assigning data to storage blocks according to results of the frequency analysis, wherein
the storage blocks are within the disk array.

2. The method of claim 1, wherein the first source is one of a file system or an application.

3. The method of claim 1, wherein
the including the data access statistics in the list of data access statistics is performed if the data access statistics describe data operations performed using a cache of a file system.

4. The method of claim 1, wherein
the excluding the data access statistics from the list of data access statistics is performed if the data access statistics describe operations performed as part of a backup process or a virus scan process.

5. The method of claim 1, wherein
the excluding the data access statistics from the list of data access statistics is performed if the data access statistics describe operations performed as part of a defragmentation process.

6. The method of claim 1, wherein
the data access statistics are received via a data plane coupling the first source and the disk array.

7. The method of claim 1, wherein
the data access statistics are received via a control plane, and
data access is performed via a data plane.

8. The method of claim 1, further comprising:
receiving the data access statistics, wherein
the instructions identify the data access statistics, and
the instructions indicate whether the data access statistics should be included or excluded from the list of data access statistics.

9. A method comprising:
identifying data access statistics, wherein
the identifying is performed by a first source;
determining whether the data access statistics should be included or excluded from a data access frequency calculation performed by a disk array, wherein
the disk array is coupled to the first source;
in response to determining that the data access statistics have been detected should be excluded from the data access frequency calculation performed by the disk array, communicating first instructions to the disk array, wherein
the first instructions indicate that the data access statistics should be excluded from a list of data access statistics used by the disk array to perform the data access frequency analysis, and
the first instructions are communicated to the disk array, if the data access statistics comprise data access statistics corresponding to background maintenance operations; and
in response to determining that the data access statistics should be included in the data access frequency calculation performed by the disk array, communicating the data access statistics and second instructions to the disk array, wherein
the second instructions indicate that the data access statistics should be included in the list of data access statistics used by the disk array to perform the data access frequency analysis, and
the second instructions are communicated to the disk array, if the data access statistics comprise data access statistics previously undetected by the disk array.

10. A computer readable storage medium comprising program instructions executable to:
receive instructions, wherein
the instructions comprise instructions regarding data access statistics, and
the instructions are received from a first source;
determine whether the data access statistics should be included or excluded from a list of data access statistics, wherein
the determining is performed by a disk array, and
the determining is based on the instructions received from the first source;
include the data access statistics in the list of data access statistics, in response to a determination that the data access statistics should be included in the list of data access statistics, wherein
the including is performed if the data access statistics comprise data access statistics previously undetected by the disk array;
exclude the data access statistics from the list of data access statistics, in response to a determination that the data access statistics should be excluded from the list of data access statistics, wherein
the excluding is performed if the data access statistics comprise data access statistics corresponding to background maintenance operations;
perform a frequency analysis using the list of data access statistics, wherein
the frequency analysis is performed by the disk array, and
the disk array is in communication with the first source; and
assign data to storage blocks according to results of the frequency analysis, wherein
the storage blocks are within the disk array.

11. The computer readable storage medium of claim 10, wherein the first source is one of a file system or an application.

12. The computer readable storage medium of claim 10, wherein
the including the data access statistics in the list of data access statistics is performed if the data access statistics describe data operations performed using a cache of a file system.

13. The computer readable storage medium of claim 10, wherein
the excluding the data access statistics from the list of data access statistics is performed if the data access statistics describe operations performed as part of a backup process or a virus scan process.

14. The computer readable storage medium of claim 10, wherein
the excluding the data access statistics from the list of data access statistics is performed if the data access statistics describe operations performed as part of a defragmentation process.

15. The computer readable storage medium of claim 10, wherein
the data access statistics are received via a data plane coupling the first source and the disk array.

16. The computer readable storage medium of claim 10, wherein
the data access statistics are received via a control plane, and
data access is performed via a data plane.

17. A system comprising:
one or more processors; and
memory coupled to the one or more processors, wherein
the memory stores program instructions executable by the one or more processors to:
receive instructions, wherein the instructions comprise instructions regarding data access statistics, and the instructions are received from a first source, determine whether the data access statistics should be included or excluded from a list of data access statistics, wherein the determining is performed by a disk array, and the determining is based on the instructions received from the first source, include the data access statistics in the list of data access statistics, in response to a determination that the data access statistics should be included in the list of data access statistics, wherein the including is performed if the data access statistics comprise data access statistics previously undetected by the disk array, exclude the data access statistics from the list of data access statistics, in response to a determination that the data access statistics should be excluded from the list of data access statistics, wherein the excluding is performed if the data access statistics comprise data access statistics corresponding to background maintenance operations, perform a frequency analysis using the list of data access statistics, wherein the frequency analysis is performed by the disk array, and the disk array is in communication with the first source; and assign data to storage blocks according to results of the frequency analysis, wherein the storage blocks are within the disk array.

18. The system of claim 17, wherein the first source is one of a file system or an application.

19. The system of claim 17, wherein the including the data access statistics in the list of data access statistics is performed if the data access statistics describe data operations performed using a cache of a file system;

the excluding the data access statistics from the list of data access statistics is performed if the data access statistics describe operations performed as part of a backup process or a virus scan process; and the excluding the data access statistics from the list of data access statistics is performed if the data access statistics describe operations performed as part of a defragmentation process.

20. The system of claim 17, wherein the data access statistics are received via a data plane coupling the first source and the disk array.

21. The system of claim 17, wherein the data access statistics are received via a control plane, and data access is performed via a data plane.

* * * * *